(12) United States Patent
Hosking et al.

(10) Patent No.: US 7,084,366 B1
(45) Date of Patent: Aug. 1, 2006

(54) METHOD FOR CONTROLLING BRAZING

(75) Inventors: F. Michael Hosking, Albuquerque, NM (US); Aaron C. Hall, Albuquerque, NM (US); Richard C. Givler, Albuquerque, NM (US); Charles A. Walker, Albuquerque, NM (US)

(73) Assignee: Sandia Corporation, Albuquerque, NM (US)

( * ) Notice: Subject to any disclaimer, the term of this patent is extended or adjusted under 35 U.S.C. 154(b) by 145 days.

(21) Appl. No.: 10/777,666

(22) Filed: Feb. 10, 2004

(51) Int. Cl.
*B23K 31/02* (2006.01)

(52) U.S. Cl. .................. 219/76.13; 228/208; 228/175

(58) Field of Classification Search ............ 219/76.13; 228/208, 254, 175
See application file for complete search history.

(56) References Cited

U.S. PATENT DOCUMENTS

| | | | |
|---|---|---|---|
| 4,609,566 A | 9/1986 | Hongo et al. | |
| 5,102,031 A * | 4/1992 | Heitman et al. | 228/175 |
| 5,686,206 A | 11/1997 | Baum et al. | |
| 5,880,425 A | 3/1999 | Carnes, Jr. et al. | |
| 5,898,994 A | 5/1999 | Miller et al. | |

OTHER PUBLICATIONS

Petzold, J. Vac. Sci. Technol. B, vol. 9 (5), Sep./Oct. 1991, p. 2664-2670.

\* cited by examiner

*Primary Examiner*—Len Tran
(74) *Attorney, Agent, or Firm*—Elmer A. Klavetter

(57) ABSTRACT

A method for making a braze joint across a discontinuity in a work piece using alternating current. A filler metal is pre-placed at a location sufficiently close to the discontinuity such that, when an alternating current is applied across a work piece to heat the work piece and melt the filler metal, the filler metal is drawn into the discontinuity. The alternating current is maintained for a set residence time, generally less than 10 seconds and more particularly less than 3 seconds. The alternating current is then altered, generally by reducing the current and/or voltage such that the filler metal can solidify to form a braze joint of desired quality and thickness.

13 Claims, 1 Drawing Sheet

(a) Solid View

(b) Transparent View

METHOD FOR CONTROLLING BRAZING

This invention was made with Government support under Contract No. DE-AC04-94AL85000 awarded by the Department of Energy. The Government has certain rights in the invention.

BACKGROUND OF THE INVENTION

The invention describes a method for making a braze joint, and more particularly, to a method of making and controlling the formation of a braze utilizing alternating current resistive heating.

Brazing is a process for joining materials, either ceramic or metallic, which relies on the melting, flow and solidification of a filler metal to form a hermetic seal, a structural bond, or both. Brazing generally requires capillary flow of liquid filler metal through a gap, joint clearance, or other discontinuity between similar or dissimilar base materials. As the filler metal advances through the discontinuity, the surface energies at the liquid-solid-gas interface define the time-dependent contact angle at this triple point phase convergence and also along the free surface contour (that is, the fillet). The properties and quality of the resulting braze joint depend on the braze flow characteristics (such as braze viscosity and surface energies) and braze reactions. The braze viscosity changes due to both compositional and thermal changes, thereby affecting flow velocity, terminal flow distance and flow time. For example, at higher brazing temperatures, a liquid braze can exhibit better spreading characteristics into the gap or clearance but often at the expense of greater base metal dissolution by the filler metal. The geometry of the discontinuity (for example, the gap) to be brazed also affects the flow characteristics.

In typical brazing methods using a braze furnace, the base metal hardware and the filler metal are enclosed in a heated chamber under a controlled atmosphere at a generally uniform temperature. The brazing process is generally performed with slow heating and cooling to minimize detrimental temperature gradients within the furnace and residual stresses in the brazed parts. Using such a process does not allow fine control of the filler metal flow characteristics or the braze joint dissolution and stress characteristics and can take from minutes to hours for the slow heating rates typically used, depending on the work mass.

DESCRIPTION OF SPECIFIC EMBODIMENTS

Figure 1:
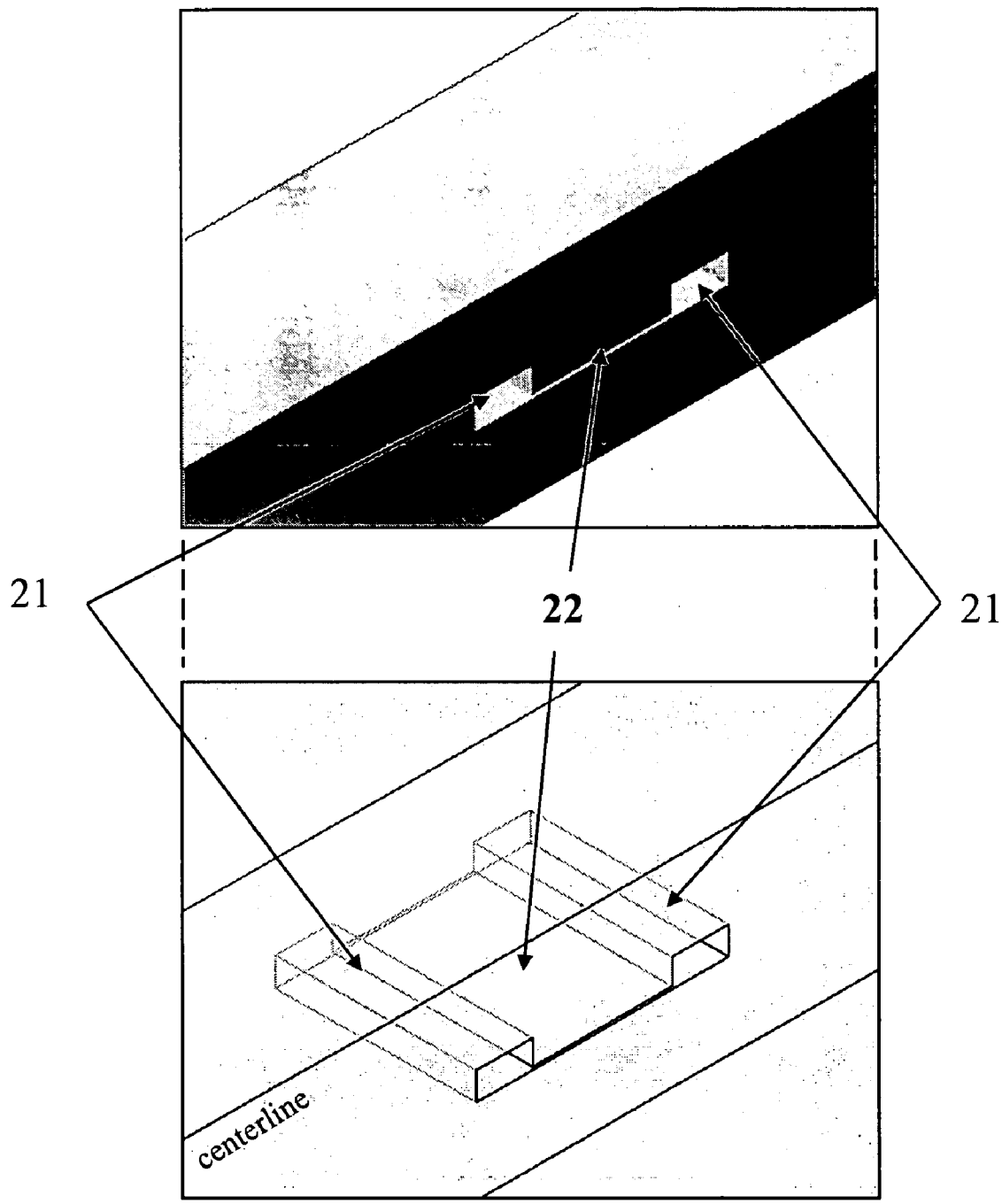
FIG. 1 shows a depiction of a work piece with a gap to be joined by brazing, showing (a) a solid view and (b) a transparent view.

In the method of the present invention, a work piece is present with a discontinuity for which a braze joint is desired to be made across the discontinuity. A filler metal is pre-placed at a location sufficiently close to the discontinuity such that, when an alternating current is applied across a work piece to heat the work piece and melt the filler metal, the filler metal is drawn into the discontinuity. The alternating current is maintained for a set residence time (where the residence time is the time above the filler metal melt temperature), generally less than 10 seconds and more particularly less than 3 seconds. The alternating current is then altered, generally by reducing the current and/or voltage such that the filler metal can solidify to form a braze joint.

In one embodiment, brazing was performed in a capillary channel across a base metal work piece, with the geometry depicted in FIG. 1, showing both a solid view (a) and a transparent view (b). The geometry shows the braze reservoir 21, the capillary channel 22 in the center and the terminal fillet cavity 23. Alternating current is applied in series by attaching clamps at the base metal ends of the work piece, where the clamps are connected to an electrical high current source; other standard electrical means for providing current across the work piece can be used. As the work piece is heated by the alternating current, the filler metal melts and is drawn into the capillary channel by means of capillary forces. The alternating current circuit produces an electromagnetic field that locally stimulates electromigration across the interface between the liquid filler metal and the solid base material, accelerating or exciting interfacial wetting, base metal dissolution and fluid flow. The alternating current can be adjusted to terminate filler metal flow, with a decrease in current decreasing liquid viscosity or melt temperature. The current application can also be controlled to produce compositional differences at the advancing liquid/vapor free surface interface, where, for example, the differences can further enhance the reaction kinetics by producing a relatively steep surface tension gradient that generates additional Marangoni convection and flow. These combined effects can cause rippling or pulsing at the liquid free surface, whose frequency and amplitude are material dependent.

In one embodiment using the geometry of FIG. 1, the base metal was elemental nickel and the filler metal was elemental copper, which melts at approximately 1085° C. The geometry comprised three functional sections: the initial braze reservoir, a capillary channel and the terminal fillet cavity. Braze material was placed in the braze reservoir and melted when heated by either alternating current or in a conventional furnace. The melted braze material was drawn into the capillary channel with a set resident time. The capillary channel was a gap of nominally 125 µm; however, braze joints using the method of the present invention can be formed across gaps, or discontinuities, as large as 500 µm or more or as small as 25 µm or less. The final braze joint composition and thickness were determined using standard analytical techniques and the joint quality evaluated by examining the joint microstructure.

Accelerated experiments were conducted between 1095–1145° C. and compared to conventional batch furnace brazing performed at 1140° C. The nominal current and voltage resistance-heating settings were 5000 amperes and 5 volts. The test results are summarized in Table 1. The resistance-heated work pieces yielded a joint chemistry that is consistent with the terminal solidus composition for the binary Cu—Ni phase diagram in a matter of seconds at the peak temperature. Conversely, the 1140° C. furnace-brazed specimen had a final composition closer to that of the lower Ni liquidus concentration, even after the longer two-minute hold at peak temperature and a total liquid resident time above 1085° C. of 11 minutes. Substantial longer furnace times (more than one hour) would be required under isothermal conditions to reach the same solidus composition value as the electromagnetically processed sample produced by the method of the present invention. The resistance-heated specimen exhibits a finer microstructure, wider net gap and higher Ni content than the conventional furnace-heated sample because of the imposed electromagnetic conditions and higher cooling rate. The resulting thermal and chemical responses of the work piece and joint depend on the joint design and the electrical properties of the base metal and filler metal.

TABLE 1

Liquid Cu - Solid Ni Binary Terminal Compositions for a nominal 125 μm Braze Gap Clearance.

| Peak Braze Temp. (° C.) | Terminal Ni Liquidus Composition at Temp. | Terminal Ni Solidus Composition at Temp. | Measured Ni Wt. % | Resident Time above 1085° C. (s) | Final Joint Thickness (μm) |
|---|---|---|---|---|---|
| Conventional batch furnace brazing | | | | | |
| 1140 | 10 | 18 | 10 | 660 | 190 |
| AC resistive heating brazing | | | | | |
| 1095 | 1 | 3 | 5 | 0.5 | 175 |
| 1120 | 8 | 12 | 14 | 1.5 | 195 |
| 1145 | 10 | 18 | 20 | 3 | 210 |

In other embodiments using the method of the present invention, base metals that can be used include standard pure metal or alloy materials, as well as ceramic materials, and include, but are not limited to, nickel, nickel alloys, titanium, titanium alloys, iron, ferrous alloys (carbon, tool or stainless steels and cast iron), refractory metal alloys, copper, copper alloys, aluminum, aluminum alloys, ceramics (oxides, nitrides and carbides), and intermetallic compounds. The filler metal can be any standard material, such as elemental, binary and multi-component alloys based on copper, silver, gold, nickel, aluminum, cobalt, and palladium compositions. Depending on the metals, the temperature to which the materials must be heated will vary, but will generally be within 600–1300° C. The peak braze temperature should be greater than the temperature required to melt the filler material and less than that which causes significant dissolution of the base metal. The base material is never melted intentionally. The resident time using the alternating current resistive heating of the present invention can be seconds and generally less than approximately 10 seconds, and often less than 3 seconds, although longer times are possible if transient liquid phase or aging reactions are desired. The conditions used will depend on the requirements for a particular application and are readily determined by one skilled in the art with minimal testing.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

We claim:

1. A method for brazing, comprising:
    applying an alternating current across a work piece, said work piece having a discontinuity, to resistively heat a pre-placed filler metal to a temperature sufficient to melt said pre-placed filler metal, said pre-placed filler metal situated near said discontinuity such that said melted pre-placed filler metal is drawn into said discontinuity;
    maintaining application of said alternating current for a set residence time, wherein said residence time is less than 10 seconds; and
    altering said application of said alternating current to achieve solidification of said filler metal.

2. The method of claim 1 wherein said alternating current is applied in series across said work piece.

3. The method of claim 1 wherein said work piece comprises a material selected from a metal and a ceramic.

4. The method of claim 1 wherein said work piece comprises a material selected from nickel, a nickel alloy, titanium, a titanium alloy, iron, a ferrous alloy (carbon, stainless steels, and cast iron), a refractory metal alloy, copper, a copper alloy, aluminum, an aluminum alloy, a ceramic, and an intermetallic compound.

5. The method of claim 4 wherein said ferrous alloy is selected from a stainless steel alloy, a cast-iron alloy, and a carbon-ferrous alloy.

6. The method of claim 1 wherein said filler metal comprises at least one material selected from copper, gold, nickel, aluminum, cobalt, and palladium.

7. The method of claim 6 wherein said filler metal is a copper-silver alloy.

8. The method of claim 1 wherein said discontinuity has a maximum dimension across said discontinuity of 500 μm.

9. The method of claim 1 wherein said residence time is less than 3 seconds.

10. The method of claim 1 wherein said alternating current is applied across said work piece by attaching clamps to said work piece, said clamps attached to an electrical current source.

11. The method of claim 1 wherein said alternating current is applied at a current of less than 5000 amperes and a voltage less than 5 volts.

12. The method of claim 1 wherein said alternating current is altered by reducing said current to less than 5000 amperes to achieve solidification of said filler metal.

13. A method for brazing, comprising:
    applying an alternating current of greater than 1000 amperes across a nickel work piece, said work piece having a discontinuity, to resistively heat a pre-placed copper filler metal to a temperature of greater than 1085° C. to melt said pre-placed copper filler metal, said pre-placed copper filler metal situated near said discontinuity such that said melted pre-placed filler metal is drawn into said discontinuity;
    maintaining application of said alternating current for a residence time greater than 0.5 seconds and less than 10 seconds; and
    reducing the amperage of said alternating current to achieve solidification of said filler metal.

* * * * *